March 29, 1966 R. C. VARNEY ETAL 3,243,151
SELF-HOLDING PIPE STRAP
Filed April 13, 1964
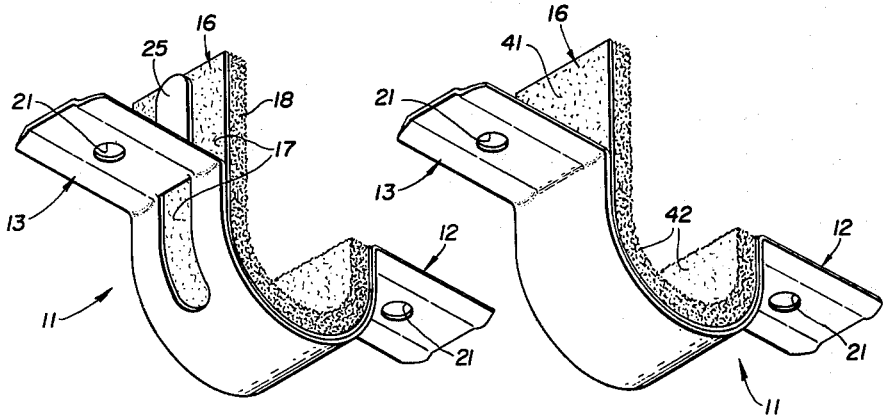
Fig. 1  Fig. 7
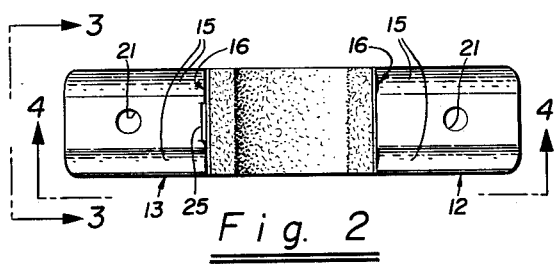
Fig. 2
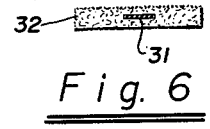
Fig. 6
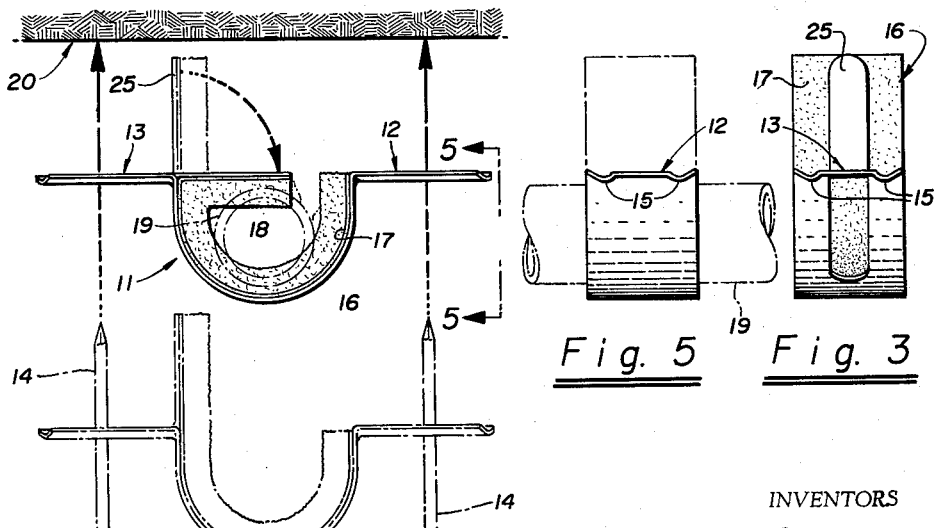
Fig. 5  Fig. 3
Fig. 4
INVENTORS
Richard C. Varney
Charles A. Varney
BY
Attorneys

United States Patent Office 3,243,151
Patented Mar. 29, 1966

3,243,151
SELF-HOLDING PIPE STRAP
Richard C. Varney, 442 Vista Linda, Mill Valley, Calif., and Charles A. Varney, Box 203, Homewood, Calif.
Filed Apr. 13, 1964, Ser. No. 359,210
7 Claims. (Cl. 248—74)

This invention relates to a self-holding pipe support of the type known as a U-shaped strap and which is particularly designed to support pipes and other materials, such as conduits, along the walls and ceilings of structures, but may be used for supporting pipes or conduits in other places.

In the past it has been the practice to wrap a liner of cushioning materials such as oakum around a pipe or conduit and then to place a U-shaped strap across the pipe. Then, while holding the liner and strap in place with one hand, the strap may be nailed or bolted to a particular structural member.

It is therefore obvious that there has been a need for a pipe support which is self-holding to a pipe, which also provides an insulation and which may easily be made to surround the pipe in the location of the support.

It is an object of the present invention to provide a pipe strap which possesses ease of installation.

It is another object of the invention to provide a pipe strap which will deaden pipe rattling and water-hammer.

It is another object of the invention to provide a pipe strap which, when properly set on a pipe or conduit, will be self-holding thereto.

Additional objects and features of the invention will appear from the following description in which a preferred embodiment has been set forth in detail in conjunction with the accompanying drawings.

Referring to the drawings:

FIGURE 1 is a view in perspective of the pipe strap according to one embodiment of the invention.

FIGURE 2 is a top view of the strap shown in FIGURE 1.

FIGURE 3 is an end view taken along the lines 3—3 indicated in FIGURE 2.

FIGURE 4 is a side view which shows the placement of the pipe strap of invention with respect to a horizontal support member and taken along the lines 4—4 of FIGURE 2.

FIGURE 5 is an end view of a pipe strap of the invention showing its relationship to a pipe and taken from the lines 5—5 in FIGURE 4.

FIGURE 6 is a transverse cross section of a liner suitable for use with one embodiment of the invention.

FIGURE 7 is a view in perspective of a second embodiment of the invention utilizing the liner shown in FIGURE 6.

Referring now more particularly to FIGURES 1 to 5 there is shown a U-shaped member 11 with ears 12 and 13 depending outwardly therefrom. The ears 12 and 13 have holes 21 therethrough so as to enable nails 14 such as shown in FIGURE 4 or other securing means to be passed through the strap to hold it and a pipe 19 to a structural member 20.

The ears 12 and 13 may be formed with longitudinal grooves 15 for structural rigidity. The ends of the ears may be relieved as shown in the drawings so as to avoid sharp edges and thus avoid accidental scraping with the hands.

There is generally provided an upward standing tongue member 25 which, as shown, is struck out from the body of the U-shaped member 11 and extends in a direction which is a continuation of one side of the U-shaped portion and generally at right angles to the ear 13.

To the inner surface of the U-shaped member is disposed a liner 16 which may be made either of insulation material or conductive material—thermal or electrical, as the need may arise. One such liner 16 may be made from a backing strip 17 bonded to a felt resilient or cushion material 18 as shown in the drawings. The backing strip may be made of any suitable tough material such as gutta-percha.

Referring now more particularly to FIGURES 4 and 5, the strap according to the invention is shown as it would be placed in operation. Generally, a pipe or conduit 19 will be placed near a point in a structure to which it is to become secured. The pipe strap is brought adjacent to the pipe as shown in FIGURE 4 and thence placed in such a manner that the inside of the U-shaped portion of the strap surrounds the pipe. The tongue 25 of the strap is then bent so as to close over the U and tend to surround the pipe 19 as shown in FIGURE 4. The attachment of the tongue 25 to the U-shaped member 11 is malleable such that the tongue 25 tends to stay in its bent or folded over position. Consequently, the strap will hold itself in position on the pipe 19.

The pipe 19 may be grasped with one hand and brought to approach the structural member 20 to which it is to be fastened. Since the strap secures itself to the pipe it is thus positioned against the structural member and nails 14 are driven through the holes 21.

As is evident, the present invention provides for the support of the strap on the pipe and thus eliminates the need for an extra retainer, such as another human hand, to keep the strap and the pipe together while they are fastened to the structure.

While we have shown a tongue which is constructed of the same material as the U-shaped member and which is struck out from it, such as a tongue may alternatively be made an integral part of the liner such as by having inserted lengthwise in the liner a ribbon or wire of malleable material.

By malleable is meant capable of being permanently deformed by bending. Such materials include, but are not limited to, copper, zinc, and the like. As shown in FIGURE 6 the ribbon 31 is integrally mounted within the resilient or cushion material 32.

Additionally as shown in the embodiment of FIGURE 7, it is possible to manufacture the backing 41 of such a stiff but malleable material that it would serve dually the function of the tongue and also as support for resilient or cushion material 42 mounted to the backing 41. Such a backing may be made of thin, yet substantial sheets of plastic materials capable of semi-permanent to permanent deformation, such as polyethylene or acrylic resins. In this embodiment the metal tongue is eliminated. The backing 41, when bent over the material placed in the strap will then serve to hold the strap to the materials in like manner to that discussed above for a tongue struck out of the strap member.

To those skilled in the art to which this invention relates, many changes in construction and other widely different embodiments and applications of the invention will suggest themselves without departing from the spirit and scope of the invention.

We claim:

1. In a U-shaped strap for holding pipe and the like to a structure, means forming a malleable metal member depending from one side only of the U of said U-shaped strap, and adapted to be bent toward the other side of said U and over any contained materials placed into said strap and to retain its bent condition so that said strap is self-held upon said contained materials by said member.

2. A U-shaped strap according to claim 1 in which cushion material is attached to the inside surface of the U of said strap and extends therefrom along said member.

3. In a U-shaped strap for holding pipe and the like to a structure, a malleable metal tongue depending from one side only of the U of said U-shaped strap and integrally joined to said strap and struck therefrom, said tongue adapted to be bent toward the other side of said U and over any contained materials placed into said strap and to retain its bent condition so that said strap is self-held upon said contained material by said tongue.

4. A U-shaped strap according to claim 3 including cushion material attached to the inner surface of the U of said strap and extending therefrom along said tongue.

5. In a U-shaped strap for holding pipe and the like to a structure, liner means disposed on the inner surface of the U of said strap and having a portion extending from one side of the U and adapted to be malleably bent toward the other side of the U and over any contained materials placed in said strap and to retain its bent condition to thereby retain said strap to the contained material.

6. In a U-shaped strap for holding pipe and the like to a structure, a strip of cushion material disposed on the inner surface of the U of said strap and having a portion extending from one side of the U, said cushion material having a ribbon of malleable material disposed therealong and thus adapted to be malleably bent toward the other side of the U and over any contained materials placed in said strap and to retain its bent condition to thereby retain said strap to the contained material.

7. In a U-shaped strap for holding pipe and the like to a structure, a strip of cushion material attached to a malleable backing, said backing being attached to the inner surfaces of the U-shaped strap and having a portion extending from one side of the U adapted to be bent toward the other side of said U and over any contained materials placed in said strap and to retain its bent condition to thereby retain said strap to the contained material.

References Cited by the Examiner
UNITED STATES PATENTS

| | | | |
|---|---|---|---|
| 1,940,456 | 12/1933 | Kohr | 248—74 X |
| 2,397,279 | 3/1946 | Le Vesconte | 248—74 |
| 2,415,517 | 2/1947 | Morehouse | 248—74 |
| 2,417,261 | 3/1947 | Morehouse | 248—74 |
| 2,618,450 | 11/1952 | Thomas | 248—74 |
| 2,712,917 | 7/1955 | Flora et al. | 248—73 |
| 3,010,195 | 11/1961 | Richards | 248—74 |

CLAUDE A. LE ROY, *Primary Examiner.*